US009239381B2

(12) United States Patent
Dutruc (10) Patent No.: US 9,239,381 B2
(45) Date of Patent: Jan. 19, 2016

(54) METHOD OF MEASURING HEIGHT AND DETECTING OBSTACLES, A RADIOALTIMETER, AND AN AIRCRAFT

(75) Inventor: Herve Dutruc, Ensues la Redonne (FR)

(73) Assignee: Airbus Helicopters, Marignane (FR)

(*) Notice: Subject to any disclaimer, the term of this patent is extended or adjusted under 35 U.S.C. 154(b) by 577 days.

(21) Appl. No.: 13/413,700

(22) Filed: Mar. 7, 2012

(65) Prior Publication Data
US 2012/0229325 A1    Sep. 13, 2012

(30) Foreign Application Priority Data

Mar. 11, 2011    (FR) .................................... 11 00733

(51) Int. Cl.
| | | |
|---|---|---|
| *G01S 13/00* | (2006.01) | |
| *G01S 13/88* | (2006.01) | |
| *G01S 7/03* | (2006.01) | |
| *G01S 13/87* | (2006.01) | |
| *G01S 13/91* | (2006.01) | |
| *G01S 13/93* | (2006.01) | |
| *G01S 13/94* | (2006.01) | |

(52) U.S. Cl.
CPC ............ *G01S 13/882* (2013.01); *G01S 7/03* (2013.01); *G01S 13/87* (2013.01); *G01S 13/91* (2013.01); *G01S 13/9303* (2013.01); *G01S 13/94* (2013.01)

(58) Field of Classification Search
CPC ..... G01S 13/9303; G01S 13/91; G01S 13/94; G01S 13/882; G01S 13/87; G01S 7/03
USPC ........................................................ 342/29
See application file for complete search history.

(56) References Cited

U.S. PATENT DOCUMENTS

| | | | | |
|---|---|---|---|---|
| 3,277,467 A | | 10/1966 | Barney | |
| 3,697,985 A | * | 10/1972 | Faris et al. | ........................ 342/72 |
| 3,947,808 A | | 3/1976 | Bateman | |
| 4,527,055 A | * | 7/1985 | Harkless et al. | ............... 250/234 |
| 4,673,937 A | * | 6/1987 | Davis | ............................... 342/72 |
| 4,737,788 A | * | 4/1988 | Kennedy | .......................... 342/29 |
| 5,047,779 A | | 9/1991 | Hager | |
| 5,314,037 A | * | 5/1994 | Shaw et al. | .................... 180/169 |

(Continued)

FOREIGN PATENT DOCUMENTS

| | | |
|---|---|---|
| CA | 2501908 A1 | 8/2003 |
| CN | 1484782 A | 3/2004 |

(Continued)

OTHER PUBLICATIONS

Chinese Notice on the First Office Action Dated Dec. 31, 2013, Application No. 201210131138.6, Applicant EUROCOPTER, 7 Pages.

(Continued)

*Primary Examiner* — Frank J McGue
(74) *Attorney, Agent, or Firm* — Brooks Kushman P.C.

(57) ABSTRACT

A radioaltimeter (5) having a signal generator-receiver (10) and signal transceiver means (20) connected to the generator-receiver (10), and a display member (30), said transceiver means (20) comprising a transceiver main member (21) for sending a signal towards a ground (S) in order to determine the height (H) between said main member (21) and said ground (S), said display member (30) having main display means (31) for displaying said height (H). Furthermore, the radioaltimeter (5) includes switch means (40) together with a control unit (50), and secondary display means (32) of said display member (30).

19 Claims, 2 Drawing Sheets

(56) References Cited

U.S. PATENT DOCUMENTS

| | | | |
|---|---|---|---|
| 5,448,233 A | 9/1995 | Saban | |
| 6,088,654 A | 7/2000 | Lepere | |
| 6,750,807 B1 | 6/2004 | Hager | |
| 6,885,334 B1 | 4/2005 | Hager | |
| 7,095,364 B1 * | 8/2006 | Rawdon et al. | 342/120 |
| 7,228,040 B2 | 6/2007 | Nakajima | |
| 7,463,183 B2 | 12/2008 | Reich | |
| 7,499,773 B2 | 3/2009 | Pire | |
| 8,190,308 B2 | 5/2012 | Pitard et al. | |
| 9,041,587 B2 * | 5/2015 | Longstaff | G01S 13/882 342/179 |
| 2008/0180310 A1 | 7/2008 | Reich | |
| 2008/0306639 A1 * | 12/2008 | Fleury et al. | 701/7 |
| 2010/0299067 A1 | 11/2010 | McCollough | |

FOREIGN PATENT DOCUMENTS

| | | | |
|---|---|---|---|
| CN | 101228491 A | 7/2008 | |
| EP | 0609162 A2 | 8/1994 | |
| EP | 1617243 A1 | 1/2006 | |
| EP | 1726973 A1 | 11/2006 | |
| FR | 2297466 A1 | 8/1976 | |
| FR | 2773609 A1 | 7/1999 | |
| FR | 2908547 A1 | 5/2008 | |
| JP | 04204191 A * | 7/1992 | G01S 13/91 |
| JP | 2008014643 A | 1/2008 | |

OTHER PUBLICATIONS

Search Report and Written Opinion; Application No. FR 1100733; dated Oct. 21, 2011.

Search Report and Written Opinion; Application No. EP 12001263; dated Jun. 20, 2012.

* cited by examiner

METHOD OF MEASURING HEIGHT AND
DETECTING OBSTACLES, A
RADIOALTIMETER, AND AN AIRCRAFT

CROSS REFERENCE TO RELATED APPLICATIONS

This application claims priority to French patent application FR 11 00733 filed on Mar. 11, 2011.

BACKGROUND OF THE INVENTION (1) Field of the Invention

The present invention relates to a method of measuring a height and of detecting obstacles, to a radioaltimeter, and to an aircraft.

(2) Description of Related Art

The invention thus lies in the technical field of detecting obstacles from on board an aircraft.

An aircraft is usually provided with a plurality of flight instruments. Such flight instruments may include a radioaltimeter that serves to determine the height between the aircraft and the overflown ground.

Such a radioaltimeter may include a generator-receiver for generating and receiving signals such as radiowaves, the signal generator-receiver co-operating with signal transceiver means and with display means. The transceiver means may comprise either an antenna suitable for transmitting and receiving a signal, or else two antennas, namely a first antenna for transmitting a signal and a second antenna for receiving a signal.

Under such circumstances, the generator-receiver causes a signal to be transmitted towards the ground by the transceiver means. The signal is reflected on the ground and then picked up by the transceiver means which in turn informs the generator-receiver. Knowing the speed of propagation of the signal and the duration of the go-and-return path of the signal from the transceiver means to the ground then from the ground to the transceiver means, the generator-receiver deduces the height of the aircraft.

Certain radioaltimeter means trigger an alarm as a function of the measured height.

A radioaltimeter is thus an instrument that is very useful. Nevertheless, that instrument is not designed to detect obstacles other than the overflown terrain.

Various other devices are known having the function of detecting obstacles.

For example, document FR 2 908 547 suggests using radar sensors cyclically transmitting signals to a central unit, the signals being presented on a display after being compared with predefined warning thresholds.

Document JP 2008/014643 also seeks to detect objects by radar waves.

Document EP 1 617 243 presents a car radar device seeking to reduce the disturbances caused by the ground.

Document FR 2 773 609 presents a device for providing assistance in aerial navigation, which device is provided with a radioaltimeter providing the height of an aircraft.

Document FR 2 297 466 relates to an excessive descent speed alarm device that makes use of a radioaltimeter for measuring altitude relative to the ground.

Document US 2010/0299067 discloses a collision avoidance device that makes use of a radiofrequency radar.

Thus, the above state of the art presents a radioaltimeter for measuring the height of a vehicle relative to the ground, and also various devices for detecting and locating obstacles in order to summarize the situation by indicating the distance between the aircraft and said obstacles.

BRIEF SUMMARY OF THE INVENTION

An object of the present invention is thus to provide a device that serves to avoid having too many pieces of equipment.

According to the invention, a radioaltimeter is provided with a signal generator-receiver for generating and receiving signals, e.g. of the radiowave type, and signal transceiver means connected to the generator-receiver, and a display member. The transceiver means comprises a transceiver main member for sending a signal towards a ground in order to determine the height between the main member and the ground, the display member having main display means for displaying the height. The generator-receiver is optionally a generator-receiver of known type as implemented in existing radioaltimeters.

This radioaltimeter is remarkable in particular in that it includes switch means together with a control unit, and secondary display means of the display member, the transceiver means including at least one transceiver secondary member for detecting an obstacle other than the ground being overflown, said aircraft being situated vertically above said ground, the main member and each secondary member being connected to the switch means. A member for evaluating detected obstacles determines a level of danger for each detected obstacle, the display member including secondary display means for displaying information relating to the detected obstacle that presents the highest level of danger, the control unit being connected to the switch means to put the main member and each secondary member in direct connection with the signal generator-receiver in a modifiable predetermined cycle and for modifying said cycle if an obstacle is detected.

Consequently, the radioaltimeter serves not only to measure the height between the aircraft and the overflown ground, the aircraft being vertically above said ground, but is capable, surprisingly, of detecting obstacles that are present in a spherical volume surrounding the aircraft. As a result there is no need to implement a dedicated detection system in addition to a radioaltimeter.

Each main or secondary member may comprise a bidirectional antenna or a set of antennas presenting a transmit antenna and a receive antenna. Furthermore, each main or secondary member is used at least once by the generator-receiver during a cycle in order to optimize detection of surrounding obstacles.

As a result, the generator-receiver transmits signals that are directed by the switch means to respective ones of the transceiver members in a cycle. Where applicable, the transceiver member receives a reflected signal. On the basis of the propagation time, the generator-receiver deduces the distance between the transceiver member and the obstacle that reflected the signal.

If the switch member was using the transceiver main member, the radioaltimeter deduces the height of the aircraft carrying the radioaltimeter. However, if the switch means was using a transceiver secondary member, the radioaltimeter deduces therefrom specifically the presence of an obstacle in the sector scanned by the transceiver secondary member used by the switch member.

Furthermore, a member for evaluating detected obstacles determines a level of danger for each detected obstacle. The display means then indicate the presence of the most dangerous obstacle, i.e. the obstacle that presents the highest level of danger.

It should be observed that in the method explained below, it is possible to modify the cycle for switching the transceiver members once an obstacle has been detected in order to monitor more closely the risky sector in which the obstacle is located, but without that restricting detection to said risky sector only.

If several obstacles are detected, it is possible to monitor more closely the risky sector in which the obstacle presenting the highest level of danger is to be found.

The radioaltimeter may also include one or more of the following characteristics.

In a first embodiment, the switch means communicate with the display means. The display means may then include a calculation member for determining both the presence of an obstacle and the height of the aircraft carrying the radioaltimeter as a function of information transmitted by the switch means indicating which transceiver member is being used and the distance measured by the generator-receiver.

The control unit may then select which transceiver member to use as a function of a predefined cycle or indeed as a function of a cycle that is selected using selector means.

Furthermore, the control unit may be connected to the display means, to the generator-receiver, or indeed to the switch means in order to determine whether an obstacle has reflected a signal as transmitted by a secondary member. If so, the control unit may modify said cycle in order to select said secondary member several times in each cycle.

It can be understood that the control member may comprise a processor or the equivalent, e.g. together with a memory.

In a second embodiment, the control unit is connected to the generator-receiver to receive information relating to the propagation duration of a signal transmitted by a secondary member and reflected by an obstacle back to the secondary member, and the control unit is connected to the display means to display information relating to at least one detected obstacle on the secondary display means.

The control unit, of the computer type having a processor for example, receives information relating to the distance between the transceiver member and an object, and knows which transceiver member is being used. Under such circumstances, the control unit causes the secondary display means to display information relating to an obstacle if the transceiver member is a secondary member, and displays on the main display means the newly measured height if the transceiver member is a main member.

It should be observed that independently of the embodiment, the main display means and the secondary display means may constitute distinct zones of a single screen, or they may comprise distinct screens.

In another aspect, the radioaltimeter comprises at least one position-determination member for determining the position of an aircraft, said member being selected from a list including:
  means for detecting the forward speed of an aircraft;
  mapping means;
  means for detecting the altitude of an aircraft; and
  means for detecting the attitude of an aircraft.

For example, the radioaltimeter, and in particular a member for evaluating detected obstacles, takes into consideration the forward speed of the vehicle in order to estimate the level of danger of an obstacle, or else the time that remains before a potential impact should the vehicle conserve the same path and the same forward speed.

In another aspect, the radioaltimeter includes manual selector means connected to the control unit to enable an individual to select the cycle from a predetermined catalog.

By way of example, the catalog includes at least one of the following cycles:
  a first cycle including scanning the main member and at least one secondary member selected from a plurality of secondary members;
  a second cycle including scanning the main member and each secondary member; and
  a third cycle including scanning the main member and each secondary member, secondary members detecting obstacles being used during each cycle for a first number of times, and secondary members not detecting obstacles being used during each cycle for a second number of times, less than said first number of times.

Furthermore, the radioaltimeter may include visible and/or audible alarm means for indicating the presence of an obstacle, and in particular for indicating the presence of the most dangerous detected obstacle. The alarm means may make use of different warnings as a function of the level of danger of the detected obstacle.

In addition to a radioaltimeter, the invention provides an aircraft including a radioaltimeter of the above-described type for measuring the height of the aircraft and for detecting obstacles other than the ground overflown by the aircraft, in a spherical volume surrounding said aircraft.

Furthermore, the aircraft extends longitudinally from a rear end to a front end, in elevation from a bottom portion to a top portion, and transversely from a left side to a right side, said aircraft being included in a spherical volume presenting a bottom main sector between the ground and the bottom portion of the aircraft, at least one front secondary sector facing the front end, at least one rear secondary sector facing the rear end, at least one left side secondary sector facing the left side, and at least one right side secondary sector facing the right side, said main member having the function of pointing towards said bottom main sector, and said radioaltimeter may comprise at least:
  a front secondary member for detecting an obstacle in the front secondary sector;
  a rear secondary member for detecting an obstacle in the rear secondary sector;
  a left side secondary member for detecting an obstacle in the left side secondary sector; and
  a right side secondary member for detecting an obstacle in the right side secondary sector.

The various secondary members are designed to operate at the same transmit/receive frequency, however they could equally well operate at different wavelengths, it being possible for the front secondary member to operate over a long range, for example, while the rear secondary member and the left and right side secondary members operate over a short range.

The invention also provides a method implemented by such an aircraft.

Thus, the invention provides in particular a method of making safe the flight of an aircraft by avoiding obstacles other than the ground overflown by the aircraft, the aircraft extends longitudinally from a rear end to a front end, in elevation from a bottom portion to a top portion, and transversely from a left side to a right side, a spherical volume surrounding the aircraft and including a main sector directed towards the ground and at least one secondary sector. The method comprises the following steps:
  transmitting successively in a given modifiable cycle:
  firstly a main signal in the main sector to measure the height between the aircraft and the overflown ground; and secondly secondary signals into each of said secondary sectors in order to detect the presence of obstacles in the secondary sectors;

if an obstacle is detected in a given secondary sector, then referred to as a risky sector, modifying said cycle to increase the first number of signals transmitted into the risky sector compared with the second number of signals transmitted into the other secondary sectors and the main sector;

establishing a level of danger for each obstacle detected in secondary sectors, for example a low level, a medium level, a high level, and a very high level; and displaying the height of the aircraft on main display means, and displaying information relating to the detected obstacle having the highest level of danger on secondary display means for drawing the pilot's attention to a specific risk.

The method may include one or more of the following additional characteristics.

For example, the given cycle is optionally established with the help of selector means operable by the pilot of the aircraft.

Furthermore, once an obstacle has been detected in a front secondary sector situated in front of the aircraft relative to the forward direction of the aircraft, the safety distance between the aircraft and the obstacle is established and then the time between a current instant and a potential impact with the obstacle is established, the level of danger being established as a function of said time or of said distance.

For example:

a low level of danger may correspond to an impact that might occur after more than 30 seconds or to an obstacle that is situated more than 50 meters from the aircraft;

a medium level of danger may correspond to an impact that might occur after a period lying in the range 30 seconds to 20 seconds, or to an obstacle situated at a distance lying in the range 50 meters to 20 meters;

a high level of danger may correspond to an impact that might occur over a period of time lying in the range 20 seconds to 10 seconds, or to an obstacle situated at a distance lying in the range 20 meters to 10 meters; and a very high level of danger may correspond to an impact that might occur within a period of less than 10 seconds or to an obstacle situated at a distance of less than 10 meters.

More specifically, when the forward speed of the aircraft is less than a predetermined threshold, the level of danger is optionally established as a function of said safety distance. In contrast, if the forward speed of the aircraft is greater than or equal to a predetermined threshold, the level of danger is established as a function of said time.

When the forward speed is high, e.g. greater than or equal to 50 knots, for example, it is found to be advantageous to monitor the time up to a potential impact in a direction relative to the forward advance of the aircraft.

However, at low speed, the distance between the aircraft and the obstacle and the way said distance is varying are found to be advantageous parameters for monitoring.

Under such circumstances, once an obstacle has been detected in a side secondary sector of the spherical volume situated on the left side or on the right side of the aircraft relative to the forward direction of the aircraft, the distance between the aircraft and the obstacle is established, and the level of danger is advantageously established as a function of the distance.

Furthermore, if the aircraft is an aircraft having a rotary wing describing a circle with a given maximum radius, the measured distance between the obstacle and the transceiver means of the aircraft is established and the level of danger is established as a function of the security distance that is equal to the difference between said radius and said measured distance.

Distinct alarms may also be issued as a function of the level of danger of the obstacle.

BRIEF DESCRIPTION OF THE SEVERAL VIEWS OF THE DRAWINGS

The invention and its advantages appear in greater detail from the following description of embodiments given by way of illustration with reference to the accompanying figures, in which.

DETAILED DESCRIPTION OF THE INVENTION

Elements that are present in more than one of the figures are given the same references in each of them.

Figure 3:
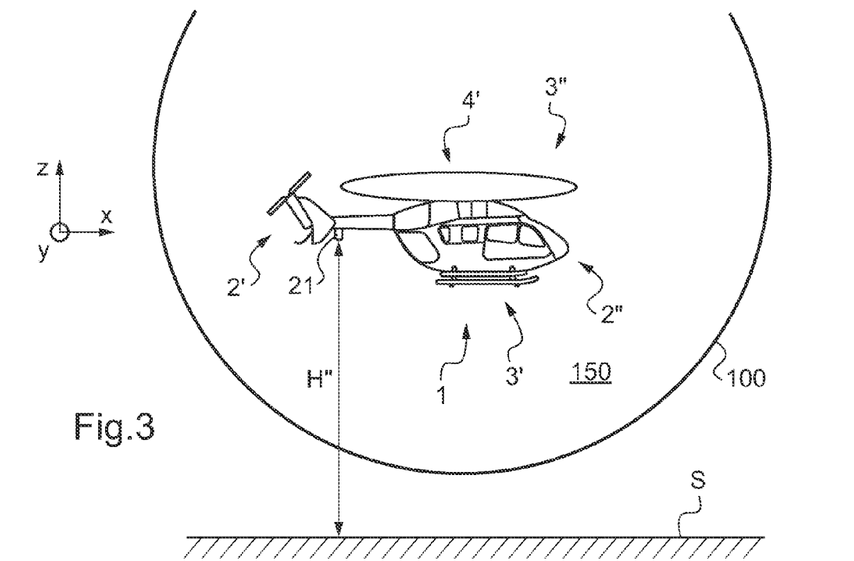
FIGS. 3 and 4 are views showing the arrangement of transceiver members on a helicopter.
Figure 4:
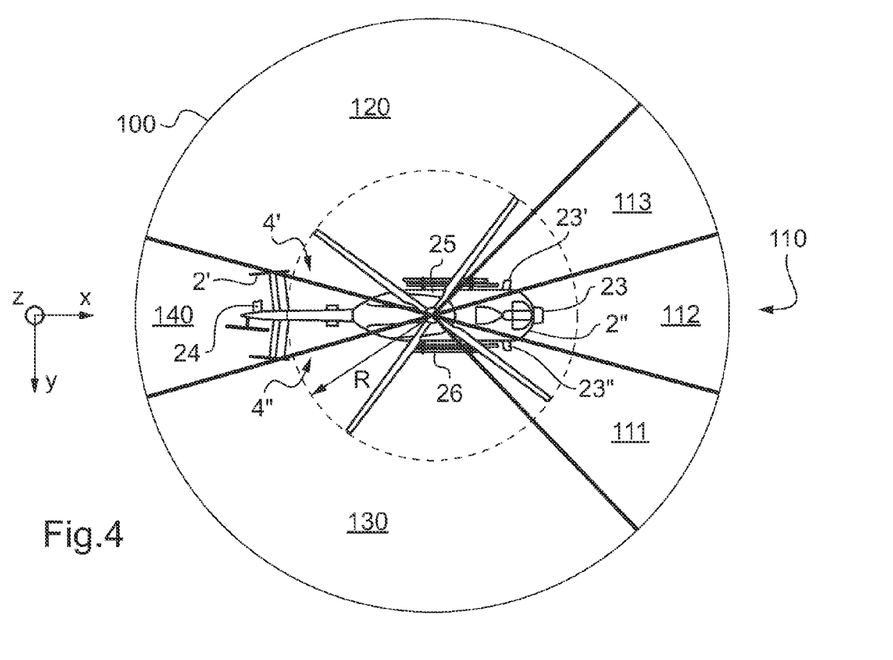

It should be observed that three mutually orthogonal directions X, Y, and Z are marked in FIGS. 3 and 4.

The first direction X is said to be "longitudinal". The term "longitudinal" relates to any direction parallel to the first direction X.

The second direction Y is said to be "transverse". The term "transverse" relates to any direction parallel to the second direction Y.

Finally, the third direction Z is said to be "in elevation". The term "in elevation" relates to any direction parallel to the third direction Z.

Figure 1:
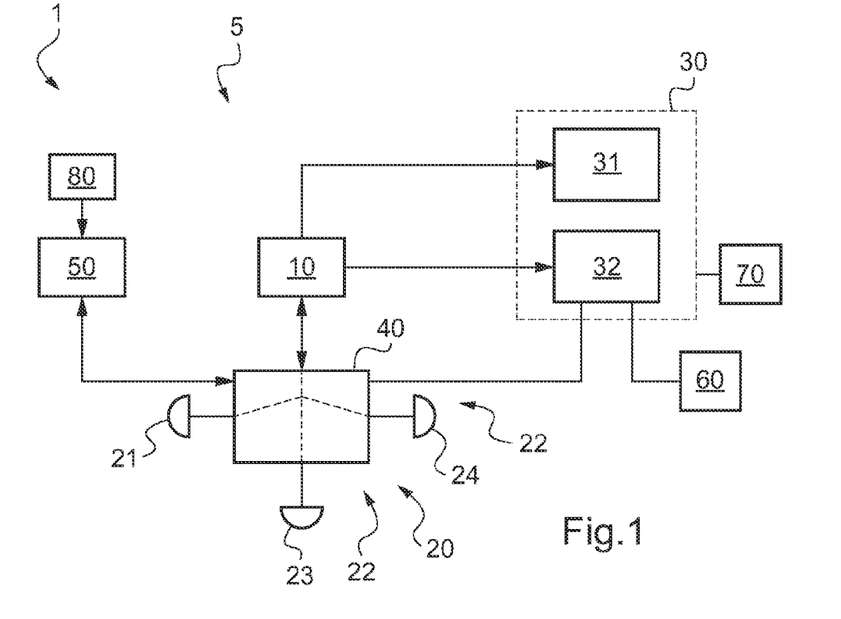
FIG. 1 is a block diagram of a first embodiment.

FIG. 1 shows an aircraft 1, represented diagrammatically and having a radioaltimeter 5 in a first embodiment of the invention.

Independently of the embodiment, the radioaltimeter 5 comprises a signal generator-receiver 10, e.g. of the radiowave type. This generator-receiver 10 may be for example of the type present in radioaltimeters prior to the invention.

The generator-receiver 10 thus generates a signal and measures the time taken by the signal to return to the aircraft after being reflected by an obstacle. Given the propagation speed of the signal, which is known and constant, the generator-receiver 10 determines the distance between the aircraft 1 and the obstacle, i.e. the ground or an obstacle that is other than the ground, for example.

In order to transmit the signal generated by the generator-receiver 10, and in order to receive the resulting reflected signal, the radioaltimeter 5 includes transceiver means 20 connected indirectly to the generator-receiver 10.

The transceiver means comprise at least one transceiver main member 21 for determining the height of the aircraft, and at least one transceiver secondary member 22 for determining the presence of an obstacle other than the ground within a spherical volume surrounding the aircraft 1.

Each member of the transceiver means, i.e. a main member 21 or a secondary member 22 may include either a bidirectional antenna or else a set of antennas including a transmit antenna and a receive antenna.

With reference to FIG. 3, the aircraft extends longitudinally along its roll axis from a rear end 2' to a front end 2", transversely along its pitching axis from a left side 4' to a right side 4", and in elevation along its yaw axis from a bottom portion 3' to a top portion 3".

The aircraft flies within a spherical volume 100 that may be subdivided into a plurality of sectors.

Under such circumstances, the main member 21 is advantageously arranged on the bottom portion 3' under the tail boom of a helicopter, for example, so as to be capable of directing a signal towards the main sector 150 of the sphere facing the ground S.

With reference to FIG. 4, the aircraft may optionally include a front secondary member for detecting an obstacle in a front secondary sector 110 facing the front end 2" of the aircraft. For example, three front secondary members 23, 23', and 23" are arranged in three subsectors 111, 112, and 113 of the front secondary sector. More particularly, two front secondary members 23' and 23" are offset by 30 degrees relative to the anteroposterior longitudinal plane of symmetry of the aircraft, while the third front secondary member 23 lies in said plane.

Furthermore, the radioaltimeter may include a rear secondary member 24 for detecting an obstacle in the rear secondary sector 140 facing the rear end 2', a left side secondary member 25 for detecting an obstacle in the left side secondary sector 120 facing the left side 4' of the aircraft, and a right side secondary member 26 for detecting an obstacle in the right side secondary sector 130 facing the right side 4".

With reference to FIG. 1, the radioaltimeter 5 also possesses switch means 40 interposed between the generator-receiver 10 and the transceiver main and secondary members 21, 22 of the transceiver means 20, and also a control unit 50 connected to the switch means 40.

The control unit 50 then controls the switch means 40 so that the switch means 40 put the main and secondary members 21 and 22 into communication in succession with the generator-receiver 10 in a cycle that is modifiable.

The switch means 40 may be a switching system between coaxial antenna lines of the transceiver means 20. The switch means 40 optionally includes coaxial relays, with the various electric contacts thereof being carefully verified in order to avoid modifying the characteristics of said coaxial lines.

The control unit may include a processor and/or a memory having stored therein a plurality of distinct cycles, each cycle being modifiable in flight as a function of any obstacles that might be detected. The control unit may possess an electronic card sending a digital frame to the switch means in order to switch from one transceiver member to another in a given modifiable cycle.

If an obstacle is detected, i.e. if a reflected signal reaches a given secondary member, the control unit 50 may modify the cycle so that the given secondary member is used more often than the other secondary members and than the main member during a cycle.

The control unit 50 may co-operate with a position-determination member 60 for determining the position of the aircraft, which member may be selected for example from a list including means for detecting the forward speed of the aircraft, mapping means, means for detecting the altitude of the aircraft, and means for detecting the attitude of the aircraft. The frequency at which a secondary member is used within a cycle may depend on information transmitted by the direction-determination member.

By way of example, it is possible to use a secondary member a large number of times while the aircraft is moving at high speed.

Furthermore, the control unit 50 may co-operate with selector means 80 operable by an individual, such as a pilot, in order to select a preferred modifiable cycle for selection from a predetermined catalog.

The catalog may include a first cycle including scanning the main member and at least one secondary member selected from a plurality of secondary members.

For example, the aircraft may have a front secondary member for detecting an obstacle situated facing the front end of the aircraft, a left side secondary member 25 for detecting an obstacle situated to the left of the aircraft, and a right side secondary member for detecting an obstacle situated to the right of the aircraft. For example, during a mountain rescue mission, if the mountainside is on the left of the aircraft, the pilot may select a cycle that makes use solely of the main member and of the left secondary member.

The catalog may also include a second cycle including scanning the main member and each of the secondary members.

Furthermore, the catalog may possess a third cycle including scanning the main member and each of the secondary members, with secondary members that detect obstacles being used during each cycle for a first number of times, while the secondary members that do not detect obstacles are used during each cycle a second number of times that is less than the first number of times. This gives precedence to the secondary members that are directed towards potential danger, but without ignoring the other secondary members that might in turn detect an obstacle.

Furthermore, the radioaltimeter includes a display member 30 provided with main display means 31 displaying the height of the aircraft and secondary display means 32 displaying information relating to an obstacle that is other than the ground over which the aircraft is flying.

For example, the main display means 31 and the secondary display means 32 represent distinct portions of a single screen. A three-dimensional display showing simultaneously the height of the aircraft and at least one detected obstacle may also be envisaged.

In another variant, the main display means 31 comprise a first screen. Under such circumstances, the secondary display means comprise at least one screen, or indeed one screen per secondary member, for example.

In another aspect, the radioaltimeter may include alarm means 70. The alarm means may have audible and/or visible alarms, that may vary as a function of the level of danger associated with an obstacle.

With reference to FIG. 1, in a first embodiment, the display means are connected to the switch means 40, to the generator-receiver 10, to the position-determination means 60, and to the alarm means 70.

The display means then include calculation means of the processor type or of the electronic card type for determining information relating to an obstacle or to the ground, as appropriate, such as the time between a present instant and a potential impact, the distance between the aircraft and an obstacle, and which secondary member detected an obstacle. For this purpose, the calculation means use the generator-receiver 10 that indicate that a signal has traveled over a measured distance. Furthermore, the calculation means communicate with the switch means 40 serving to indicate which member of the transceiver means 20 was used, and consequently the sector into which the signal was transmitted and from which it was reflected, and possibly also with the position-determination means in order to obtain information about the aircraft, for example.

Figure 2:
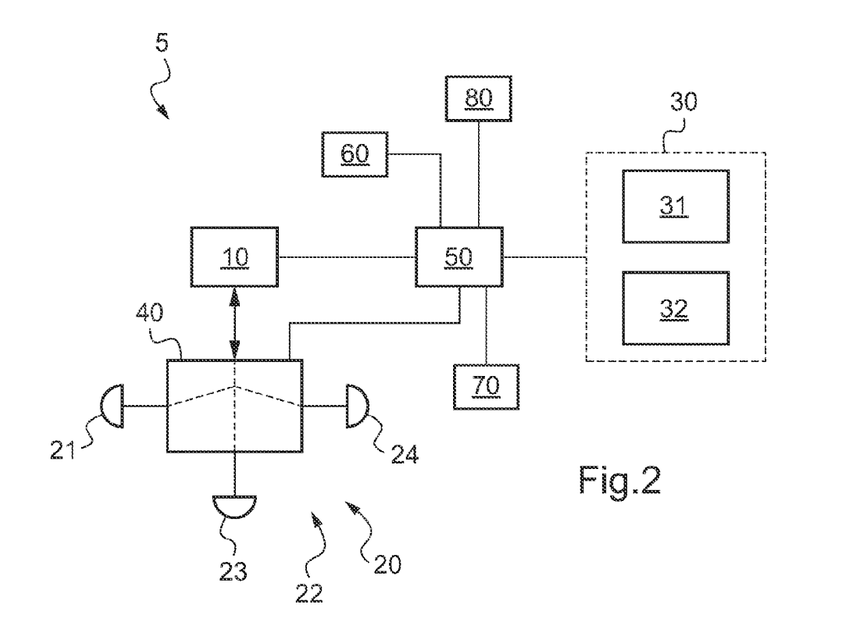
FIG. 2 is a block diagram of a second embodiment.

With reference to FIG. 2, in a second embodiment, the control unit is connected in particular to the display means 30, to the switch means 40, to the generator-receiver 10, to the detection means of the position-determination member 60, and to the alarm means 70.

Independently of the embodiment, the radioaltimeter 5 makes use of a method for making the flight of an aircraft safe so as to avoid the aircraft striking the ground or an obstacle other than the ground.

In a first step of the method, the radioaltimeter 5 transmits signals at a given cycle into a plurality of sectors of a spherical volume 100 surrounding the aircraft.

On each cycle, the radioaltimeter 5 transmits in succession a signal into a main sector in order to determine the height of the aircraft relative to the ground over which it is flying, i.e. the ground vertically below the aircraft, and a signal in at least one secondary sector of the spherical volume 100 in order to detect the presence of obstacles that are potentially dangerous for the safety of the aircraft.

In a second step of the method, if an obstacle is detected in a secondary sector, referred to as the risky sector for convenience, then the cycle is modified so as to increase the first number of signals transmitted into said risky sector compared with the second number of signals transmitted into the other secondary sectors and into the main sector. For example, two signals are transmitted per cycle into the risky sector, while only one signal is transmitted into the other sectors, per cycle.

In a third step, the height H of the aircraft is displayed on the main display means 31. Furthermore, information relating to at least one detected obstacle is displayed on secondary display means, e.g. the distance between the aircraft and the obstacle, the time between the current instant and a potential impact when the secondary member has enabled an obstacle to be detected, and/or a three-dimensional representation of the obstacle relative to the aircraft.

Furthermore, a member for evaluating detected obstacles establishes a level of danger for the obstacles, in order to display this level of danger. Depending on the embodiment, the evaluation member may be an independent member. The evaluation member may also be constituted by the processor of the control unit or by the calculation means of the display unit.

In a preferred embodiment, information is displayed only relating to the obstacle that presents the highest level of danger so as to minimize the amount of information sent to the pilot and improve the pilot's reaction time.

Furthermore, during the third step, it is possible to trigger an alarm, which alarm may present different aspects depending on the level of danger.

For example, the alarm means may include an indicator displaying a light spot that may be steady or flashing so long as the obstacle presents a low level of danger. For a medium level of danger, the alarm means may issue not only said light spot but also a low level audible alarm in the pilot's headset, which audible alarm increases in intensity for high and very high levels of danger. In addition to the sound level increasing with increasing level of danger of the obstacle, the audible alarm may be discontinuous when an obstacle presents a low level of danger and may then accelerate as the level of danger of the obstacle increases until it becomes a continuous audible signal.

It should be observed that in the absence of any non-ground obstacle being detected, each secondary member 22 and the main member may be used once per cycle, for example.

In contrast, if an obstacle is detected in a risky sector, the risky sector may be used twice per cycle at a low level of danger, three times per cycle at a medium level of danger, four times per cycle at a high level of danger, and six times per cycle for a very high level of danger.

It should be understood that the values given are provided merely by way of indication.

Furthermore, in order to determine the level of danger of an obstacle detected in a front secondary sector, the security distance between the aircraft and the obstacle is detected and then the time to a potential impact with said obstacle is determined, the level of danger being established as a function of said time or as a function of said distance. The time to a potential impact with the obstacle may be obtained using the forward speed of the aircraft towards the obstacle.

When the forward speed of the aircraft is less than a predetermined threshold, then the level of danger may be established for example as a function of said safety distance. In contrast, when the forward speed of the aircraft is greater than or equal to the predetermined threshold, then the level of danger is established as a function of said time.

During such forward flight, the cycle may optionally use the main member and only those of the secondary members that face the front secondary sector.

In addition, if an obstacle is detected in a side secondary sector 120, 130 situated on the left side 4' or on the right side 4" of the aircraft 1 relative to the forward direction of said aircraft, then the level of danger is established as a function of the distance between the aircraft and the obstacle.

Furthermore, when the distance between the aircraft and the obstacle is used, if the aircraft has a rotary wing describing a circle of given radius R, as shown in FIG. 4, the level of danger is established as a function of a safety distance equal to the difference between the radius R and the measured distance between the obstacle and the transceiver means of the aircraft.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A radioaltimeter having a signal generator-receiver and signal transceiver means connected to the signal generator-receiver, the signal transceiver means having a transceiver main member for sending a signal towards ground (S) overflown by an aircraft in order to determine a height (H) between the transceiver main member and the ground (S), the radioaltimeter further including switch means together with a control unit, the signal transceiver means including a plurality of transceiver secondary members for detecting obstacles other than the ground (S), the transceiver main member and each of the plurality of transceiver secondary members being connected to the switch means, the radioaltimeter further including at least one position-determination member configured to determine the position of the aircraft, the control unit being connected to the switch means to alternately put the transceiver main member and the transceiver secondary members in direct connection with the signal generator-receiver one transceiver member at a time at least one time each in a cycle with a frequency at which the transceiver secondary members are put in direct connection with the signal generator-receiver during the cycle being dependent on a position of the aircraft, provided by the at least one position-determination member, while no obstacle other than the ground is detected by any of the transceiver secondary members, such that depending on the position of the aircraft at least one of the transceiver secondary members is put in direct connection with the signal generator-receiver at a greater frequency during the cycle than at least one other of the transceiver secondary members, and to modify the cycle when an obstacle other than the ground is detected.

2. The radioaltimeter according to claim 1, wherein the control unit is connected to the signal generator-receiver to receive information relating to propagation duration of a signal transmitted by one of the transceiver secondary members and reflected by an obstacle back to the one of the transceiver secondary members.

3. The radioaltimeter according to claim 1, wherein the at least one position-determination member is configured to determine the position of the aircraft based on at least one of forward speed of the aircraft, a map, an altitude of the aircraft, and an attitude of the aircraft.

4. The radioaltimeter according to claim 1, including a manual selector connected to the control unit to enable an individual to select the cycle from a predetermined catalog.

5. The radioaltimeter according to claim 1, wherein:
the control unit modifies the cycle when an obstacle other than the ground is detected such that each transceiver secondary member detecting an obstacle is put in direct connection with the signal generator-receiver at a greater frequency during the cycle than the transceiver secondary members not detecting an obstacle.

6. The radioaltimeter according to claim 1, including alarm means for indicating the presence of an obstacle.

7. The radioaltimeter of claim 1 further including a member for evaluating detected obstacles to determine a level of danger for each detected obstacle.

8. The radioaltimeter of claim 7 further including a display member having main display means for displaying the height (H) and secondary display means for displaying information relating to the detected obstacle presenting a highest level of danger.

9. The radioaltimeter of claim 8, wherein the control unit is connected to the display member to display information relating to at least one detected obstacle on the secondary display means.

10. An aircraft, including a radioaltimeter according to claim 1 for measuring the height (H) of the aircraft and for detecting obstacles other than the ground overflown by the aircraft, in a spherical volume surrounding the aircraft.

11. The aircraft according to claim 10, wherein the aircraft extends longitudinally from a rear end to a front end, in elevation from a bottom portion to a top portion, and transversely from a left side to a right side, the aircraft being included in the spherical volume presenting a bottom main sector between the ground and the bottom portion of the aircraft, at least one front secondary sector facing the front end, at least one rear secondary sector facing the rear end, at least one left side secondary sector facing the left side, and at least one right side secondary sector facing the right side, the transceiver main member having the function of pointing towards the bottom main sector, and the plurality of transceiver secondary members comprise at least:
a front transceiver secondary member for detecting an obstacle in the front secondary sector;
a rear transceiver secondary member for detecting an obstacle in the rear secondary sector;
a left side transceiver secondary member for detecting an obstacle in the left side secondary sector; and
a right side transceiver secondary member for detecting an obstacle in the right side secondary sector.

12. A method of making safe the flight of an aircraft by avoiding obstacles other than the ground overflown by the aircraft, the aircraft extends longitudinally from a rear end to a front end, in elevation from a bottom portion to a top portion, and transversely from a left side to a right side, a spherical volume surrounding the aircraft and including a main sector directed towards the ground and a plurality of secondary sectors directed towards respective portions of the spherical volume surrounding the aircraft other than towards the ground, the method comprising:
determining a position of the aircraft using a position-determination member;
transmitting successively in a given modifiable cycle:
firstly a main signal into the main sector to measure height (H) between the aircraft and the ground (S); and
secondly a number of secondary signals into each of the secondary sectors in order to detect the presence of obstacles in the secondary sectors, wherein the number of secondary signals transmitted into the secondary sectors during the cycle depends on a position of the aircraft, provided by the position-determination member, while no obstacles are detected in the secondary sectors, such that depending on the position of the aircraft a number of secondary signals transmitted into at least one of the secondary sectors is greater than a number of secondary signals transmitted into at least one other of the secondary sectors;
if an obstacle is detected in a given secondary sector, then referred to as a risky sector, modifying the given modifiable cycle to increase a first number of secondary signals transmitted into the risky sector compared with a second number of secondary signals transmitted into the other secondary sectors;
establishing a level of danger for each obstacle detected in secondary sectors; and
displaying the height (H) of the aircraft on main display means, and displaying information relating to the detected obstacle having the highest level of danger.

13. The method according to claim 12, wherein the given modifiable cycle is established with the help of a selector operable by a pilot of the aircraft.

14. The method according to claim 12, wherein once an obstacle has been detected in a front secondary sector situated in front of the aircraft relative to a forward direction of the aircraft, a safety distance between the aircraft and the obstacle is established and then the time to a potential impact with the obstacle is established, the level of danger being established as a function of the time or of the distance.

15. The method according to claim 14, wherein when a forward speed of the aircraft is less than a predetermined threshold, the level of danger is established as a function of the safety distance; and wherein when the forward speed of the aircraft is greater than or equal to the predetermined threshold, the level of danger is established as a function of the time.

16. The method according to claim 12, wherein once an obstacle has been detected in a side secondary sector of the spherical volume situated on the left side or on the right side of the aircraft relative to a forward direction of the aircraft, the distance between the aircraft and the obstacle is established, and the level of danger is established as a function of the distance.

17. The method according to claim 12, wherein for an aircraft having a rotary wing describing a circle of given radius (R), the measured distance between the obstacle and transceiver means of the aircraft is established and the level of danger is established as a function of a security distance that is equal to the difference between the radius (R) and the measured distance.

18. A radioaltimeter for an aircraft, the radioaltimeter comprising:
a signal generator-receiver;
a signal transceiver connected to the signal generator-receiver, the signal transceiver having a transceiver main member for detecting a height of the aircraft above ground overflown by the aircraft and a plurality of transceiver secondary members for detecting obstacles other than the ground;

a position-determination member configured to determine a position of the aircraft;

a switch connected to the signal generator-receiver and the signal transceiver; and a controller configured to control the switch to alternately put the transceiver main member and the transceiver secondary members in direct connection with the signal generator-receiver one transceiver member at a time at least one time each in a cycle with a frequency at which the transceiver secondary members are put in direct connection with the signal generator-receiver during the cycle being dependent on a position of the aircraft, provided by the at least one position-determination member, while no obstacle other than the ground is detected by any of the transceiver secondary members, such that depending on the position of the aircraft at least one of the transceiver secondary members is put in direct connection with the signal generator-receiver at a greater frequency during the cycle than at least one other of the transceiver secondary members, the controller further configured to modify the cycle when an obstacle other than the ground is detected.

19. The radioaltimeter of claim 18 wherein:
the aircraft is a helicopter.

* * * * *